(12) United States Patent
Shimanuki et al.

(10) Patent No.: US 9,598,194 B2
(45) Date of Patent: Mar. 21, 2017

(54) FILM SEALING MECHANISM

(71) Applicant: NIHON SAFETY CO., LTD., Tokyo (JP)

(72) Inventors: Akio Shimanuki, Tokyo (JP); Yoshikazu Onishi, Tokyo (JP)

(73) Assignee: NIHON SAFETY CO., LTD., Tokyo (JP)

( * ) Notice: Subject to any disclaimer, the term of this patent is extended or adjusted under 35 U.S.C. 154(b) by 454 days.

(21) Appl. No.: 14/115,474

(22) PCT Filed: Aug. 6, 2013

(86) PCT No.: PCT/JP2013/004760
§ 371 (c)(1),
(2) Date: Jul. 9, 2014

(87) PCT Pub. No.: WO2015/019383
PCT Pub. Date: Feb. 12, 2015

(65) Prior Publication Data
US 2016/0347491 A1  Dec. 1, 2016

(51) Int. Cl.
*B65F 1/00* (2006.01)
*B65F 1/06* (2006.01)
(Continued)

(52) U.S. Cl.
CPC ............ *B65B 51/10* (2013.01); *A47K 11/026* (2013.01); *B65B 9/20* (2013.01)

(58) Field of Classification Search
CPC ...... B65F 1/00; B65F 1/06; B65F 1/10; B65F 1/16; A47K 11/02
(Continued)

(56) References Cited

U.S. PATENT DOCUMENTS

3,401,409 A * 9/1968 Ekrut ................... A47K 11/026
4/484
3,452,368 A * 7/1969 Couper ................ A47K 11/026
4/484
(Continued)

*Primary Examiner* — Andrew M Tecco
*Assistant Examiner* — Praachi M Pathak
(74) *Attorney, Agent, or Firm* — Kratz, Quintos & Hanson, LLP (57) ABSTRACT

To allow a tubular film having a large opening diameter to be heat-sealed with a short length heater by a function (film width reduction function) that can reduce a size of an opening portion of the tubular film uniformly with a simple structure even when the width reduction operation is performed repeatedly.
There is provided a film sealing mechanism provided with an elongated heater and a heater receiver configured to abut against the heater, the heater and heater receiver being disposed opposite, in a direction perpendicular to a position of the feed means, to a tubular film in which content is accommodated and which is fed downward from a film passage port by a feed means such as a feed roller with its both left and right end portions in a width direction supported, so as to be capable of holding outer surfaces of the film therebetween. The film sealing mechanism includes: a fixed bracket including the heater and two parallel extending film guides vertically sandwiching the heater; and a moving bracket disposed opposite to the fixed bracket and including the heater and film guides formed in a front surface of the heater receiver or parallel extending film guides disposed so as to vertically sandwich the heater receiver. The film guides of the fixed bracket each include first wing-like parts having a shape in which outer edges obliquely abutting against substantially both left and right side surfaces of the tubular film as viewed from above are opened toward the moving bracket. The film guides of the moving bracket each include second wing-like parts having a shape in which outer edges obliquely abutting against substantially both left and right (Continued)

side surfaces of the tubular film as viewed from above are opened toward the fixed bracket.

6 Claims, 8 Drawing Sheets

(51) Int. Cl.
    *B65F 1/10*          (2006.01)
    *B65F 1/16*          (2006.01)
    *A47K 11/02*        (2006.01)
    *B65B 51/10*        (2006.01)
    *B65B 9/20*          (2012.01)

(58) Field of Classification Search
    USPC .................................... 53/477, 567; 4/484
    See application file for complete search history.

(56) References Cited

U.S. PATENT DOCUMENTS

| | | | | |
|---|---|---|---|---|
| 3,908,336 A * | 9/1975 | Forslund | ............... | B65B 9/15 |
| | | | | 4/484 |
| 5,803,299 A * | 9/1998 | Sealy, Jr. | ............... | B65F 1/062 |
| | | | | 220/495.07 |
| 5,960,487 A * | 10/1999 | Hawkins | ............... | A47K 11/026 |
| | | | | 4/449 |
| 6,065,272 A * | 5/2000 | Lecomte | ............... | B29C 65/222 |
| | | | | 53/459 |
| 6,101,641 A * | 8/2000 | Hawkins | ............... | A47K 11/02 |
| | | | | 4/449 |
| 6,131,371 A * | 10/2000 | Esser | ............... | B65B 31/00 |
| | | | | 209/930 |
| 6,212,701 B1 * | 4/2001 | He | ............... | A47K 11/026 |
| | | | | 4/449 |
| 6,341,386 B1 * | 1/2002 | Phillips | ............... | A47K 11/06 |
| | | | | 4/479 |
| 7,178,314 B2 * | 2/2007 | Chomik | ............... | B65B 67/1277 |
| | | | | 53/370 |
| 7,350,663 B2 * | 4/2008 | Chomik | ............... | A61N 1/325 |
| | | | | 220/264 |
| 7,389,630 B2 * | 6/2008 | Nakano | ............... | B65B 9/02 |
| | | | | 53/553 |
| 8,333,293 B2 * | 12/2012 | Morand | ............... | B65F 1/062 |
| | | | | 220/263 |
| 8,752,723 B2 * | 6/2014 | Lucas | ............... | B65F 1/062 |
| | | | | 220/495.07 |
| 2004/0194433 A1 * | 10/2004 | Chomik | ............... | B65B 67/1277 |
| | | | | 53/459 |
| 2006/0010837 A1 * | 1/2006 | Jurus | ............... | B65F 1/062 |
| | | | | 53/436 |
| 2007/0045324 A1 * | 3/2007 | Mitchell | ............... | B65F 1/0006 |
| | | | | 220/495.11 |
| 2008/0000204 A1 * | 1/2008 | Turvey | ............... | B65B 31/024 |
| | | | | 53/512 |
| 2009/0165196 A1 * | 7/2009 | Mochizuki | ............... | A47K 11/026 |
| | | | | 4/315 |
| 2009/0255045 A1 * | 10/2009 | Sakurai | ............... | A47K 11/026 |
| | | | | 4/484 |
| 2011/0156903 A1 * | 6/2011 | Henniges | ............... | B62B 3/106 |
| | | | | 340/540 |
| 2013/0067857 A1 * | 3/2013 | McDaid | ............... | B65B 67/1277 |
| | | | | 53/77 |
| 2013/0125301 A1 * | 5/2013 | Natt | ............... | A47K 11/02 |
| | | | | 4/484 |
| 2014/0208499 A1 * | 7/2014 | Livingston | ............... | A47K 11/02 |
| | | | | 4/484 |
| 2014/0263348 A1 * | 9/2014 | Liistro | ............... | B65F 1/1646 |
| | | | | 220/495.06 |

* cited by examiner

FILM SEALING MECHANISM

TECHNICAL FIELD

The present invention relates to a film sealing mechanism which is configured to heat seal a tubular film, especially, a tubular film having a large opening diameter, in which content such as bodily waste or sewage is accommodated at a position decentered from a feed mechanism of the film sealing mechanism and which is provided with a width reduction function suitable for heat sealing of the film.

BACKGROUND ART

Many types of heat sealing mechanisms are disclosed in, for example, Patent Documents 1 to 3, including JP 04-317905 A. The known heat sealing mechanisms are configured to heat seal an opening of a tubular film in which content is accommodated, followed by heat fusion cutting, to form a film pack.

In the known heat sealing mechanisms for forming the film pack, when a diameter of the to-be-heat-sealed opening of the tubular film is large, the opening portion of the tubular film is forcibly narrowed to reduce a front width (left-right width) of the opening portion, and heat sealing of the opening portion is carried out with the width-reduced portion held between a rod-like or linear heater and a heater receiver facing the heater.

Incidentally, if the width reduction is not forcibly performed, the left-right width of the to-be-sealed portion of the tubular film remains larger than a left-right width of a film passage port of the film sealing mechanism. Accordingly, the left-right width of the to-be-sealed portion of the tubular film becomes larger than a left-right width of the heater, resulting in failing to heat seal both left and right ends of the film.

For example, with regard to the width reduction function, a portable toilet device, which is configured to heat seal a tubular film accommodating bodily waste therein using a film sealing mechanism installed in a vertically small space, is provided with a means for performing width reduction for the heat sealing while retaining the film so as not to cause the film to be removed from a feed roller and making a width (length) or a width-direction thickness of the width-reduced film substantially uniform. Such a configuration is not proposed in known heat sealing mechanisms to be listed below.

The reason for performing the width reduction when heat sealing the tubular film is as follows. If a length of the film opening portion to be heat-sealed is large, a heater to be used needs to have a corresponding length. When the length of the heater is increased, power consumption is correspondingly increased, which poses a problem that a power supply other than a commercial power supply, that is, a portable type comparatively compact and small capacity power supply such as a secondary battery or a stacked cell for car battery or a primary battery such as a dry cell cannot be used.

In such a case, when a device in which the tubular film to be heat-sealed is mounted is a portable or transportable toilet device, there occurs another problem that the toilet device can be used only a location where a commercial power supply is available.

Thus, in order to allow use of a short length heater that has less power consumption and that can be operable with a compact power supply, it is necessary to make a length (lateral (left-right) width when viewing the tubular film from front) of a portion to be heat-sealed shorter than the large opening portion of the tubular film. Moreover, it is not sufficient to only slightly reduce the left-right width, that is, unless the thickness of the width-reduced film is as uniform as possible, homogeneous heat sealing cannot be achieved.

In view of the above problem, there is proposed a technology that performs processing of reducing the length of the opening portion of the tubular film having the larger opening diameter before the heat sealing, that is, "film width reduction" so as to allow the heat sealing to be achieved with a short length heater.

As one of conventionally proposed width reduction mechanisms, there is known a complicated mechanism in which the opening diameter of the film is narrowed from both front-rear and left-right directions of the opening portion in a crossing manner. Such a complicated mechanism has not only a problem in that the mechanism is not accommodated in a space having a small vertical width but also a problem in that it is difficult to make uniform even the thickness of the width-reduced portion of the film whose seal portion after the width reduction is less likely to be uniform.

On the other hand, in the portable or transportable toilet device, a tubular film set in a toilet bowl in a folded manner is guided from a film passage port formed at a lower portion of the toilet bowl to a feed roller provided below the film passage port. The film passage port has a substantially circular or ellipsoidal shape, which is the same as a shape of an opening of the toilet bowl. However, the shape of the film passage port formed above the feed roller is substantially a rectangular shape as viewed from above, and, moreover, guide walls formed so as to extend continuously from the rectangular film passage port are flat upright walls. Thus, the effect of both the rectangular passage port and flat upright guide walls continuously extending from the passage port poses a problem in that the tubular film drawn into the passage port by rotation of the feed roller easily gather to both corners of the rectangular passage. This is one of the causes that prevent the width of the film opening portion from being made smaller than a width of the film passage port or smaller than a width of the left and right rollers.

CITATION LIST

Patent Document

Patent Document 1: JP 04-317905 A
Patent Document 2: JP 04-317903 A
Patent Document 3: JP 2006-69579 A

SUMMARY OF INVENTION

Technical Problem

An object of the present invention is therefore to provide a heat sealing mechanism having a width reduction function capable of reducing, with a simple structure, the width of the opening portion of the tubular film having a large opening diameter substantially uniformly in terms of the left-right width and thickness of the film; capable of always reducing the width of the film opening portion more than the width of the film passage port of the film sealing mechanism or than an interval between left and right rollers even when the width reduction operation is performed repeatedly; and capable of making the thickness of the width-reduced film in the width direction substantially uniform, to thereby achieve heat sealing with a heater having a short length; and, moreover, capable of exerting the above performance even when a space between the film passage port lower end and heater, in which the heat seal mechanism is installed, is narrow in width.

Solution to Problem

To solve the above problems, according to the present invention, there is provided a film sealing mechanism provided with an elongated heater and a heater receiver configured to abut against the heater, the heater and heater receiver being disposed opposite, in a direction perpendicular to a position of the feed means, to a tubular film in which content is accommodated and which is fed downward by a feed means such as a feed roller with its both left and right end portions in a width direction supported, so as to be capable of holding outer surfaces of the film therebetween. The film sealing mechanism includes: a fixed bracket including the heater and two parallel extending film guides vertically sandwiching the heater; and a moving bracket disposed opposite to the fixed bracket and including the heater and film guides formed in a front surface of the heater receiver or two parallel extending film guides disposed so as to vertically sandwich the heater receiver. The film guides of the fixed bracket each include first wing-like parts having a shape in which outer edges obliquely abutting against substantially both left and right side surfaces of the tubular film as viewed from above are opened toward the moving bracket. The film guides of the moving bracket each include second wing-like parts having a shape in which outer edges obliquely abutting against substantially both left and right side surfaces of the tubular film as viewed from above are opened toward the fixed bracket.

In the above film sealing mechanism, the fixed bracket and moving bracket each include the linear film guides at an intermediate portion between the fixed bracket and moving bracket and wing-like parts formed on the left and right sides thereof. Thus, as viewed from above, the opening portion of the film can be narrowed by the upper and lower film guides at the intermediate portion between the both brackets and wing-like parts formed on the left and right sides of each guide simultaneously from its front, rear, left, and right sides, so that the opening portion of the tubular film can be suitably subjected to width reduction (closing) over the substantially entire periphery thereof.

As described above, in the present invention, by the width reduction action achieved by the pair of film guides disposed so as to be vertically spaced apart from each other and pair of first and second wing-like parts, the opening portion of the tubular film is subjected to width reduction in such a manner so as to be narrowed over the entire periphery thereof with a vertical width of the film guides and wing-like parts. Thus, it is possible to shape the fed tubular film, in a substantially uniform manner, into a size that falls within the left and right width (front length) of each of the heater and heater receiver.

At the intermediate portion of the fixed bracket in which the heater is provided, the two tiered upper and lower film guides are disposed so as to vertically sandwich the heater. Moreover, the guide parts each softly retaining the leading end of the second wing-like part of the advancing moving bracket and guiding the same are formed on the left and right sides of the film guide. With this configuration, the width reduction mechanism constituted by the film guides and wing-like parts formed on the fixed bracket and moving bracket can perform smoothly and reliably the width reduction operation.

Moreover, in the present invention, in order to make feeding operation of the tubular film to the feed rollers smooth to achieve the above width reduction effect, the film passage port positioned below the toilet seat of the toilet device is formed into a substantially oval shape or a circular shape as viewed from above, and the guide wall continued from the passage port is formed into a circular shape continuously extending from the passage port and formed as a stepped guide wall in which an inclination angle is changed in the middle thereof.

In the above film sealing mechanism, a positional relationship between a film holding portion of the feed rollers and an abutting line (heat sealing line at which the heater and heater receiver are brought closest to each other: vertical plane passing an abutment line between the heater and heater receiver) between the heater and heater receiver is set such that a vertical plane passing the film holding portion of the feed rollers and the heat sealing line are offset to each other. This is for preventing the film from being removed from the feed rollers even when the seal width of the film is reduced (narrowed) by the width reduction action. Incidentally, if the film width is reduced at a portion just below (same phase position as) the feed roller, the film may be removed from the holding surfaces of the feed rollers.

Advantageous Effects of the Invention

In the heat sealing mechanism according to the present invention, the moving bracket and fixed bracket disposed opposite to each other each include the linear film guides at the intermediate portion between the fixed bracket and moving bracket and two sets of wing-like parts formed on the left and right sides thereof each having an oblique outer edge with respect to the film opening portion to constitute the width reduction section. Moreover, the left-right widths of the film guides and respective wing-like parts on a base side thereof are set to a size corresponding to a length of a heater (or heater receiver) having a length smaller than the lateral width of the film passage port or interval between the left and right feed rollers. Thus, by the width reduction action achieved by the opposing upper and lower film guides and wind-like parts of each of the upper and lower film guides, it is possible to shape the opening portion of the film into a reduced form such that the opening portion is made substantially equal to or smaller than the length of the heater while preventing the width-reduced film from being distributed unevenly within a range corresponding to the upper-lower width thereof to be subjected to the width reduction action. The film whose opening portion is reduced in such a width reduction form is held between the heater and heater receiver in a state where the thickness of the width-reduced film is made substantially uniform in the length direction of the heater, and the film is melted by heat of the heater in this state, and the opening portion that has been shaped into a reduced form is heat-sealed in an unchanged form.

Moreover, in the present invention, in order to realize the width reduction in which the film is not distributed unevenly in the length direction of the heater, the film passage port through which the film is fed to the feed rollers provided below the toilet seat of the toilet device is formed into a substantially circular shape as viewed from above, and the guide wall formed so as to extend continuously from the passage port is formed as a stepped guide wall in which an inclination angle is changed in the middle thereof so as to allow the tubular film to be fed to the feed rollers to be supplied to the feed rollers in a substantially uniform distribution, which contributes to achievement of the width reduction for suitable and reliable heat sealing.

Moreover, in the present invention, a folding chute inclined downward toward the moving bracket is provided at a portion below the fixed bracket, at which the film is heat-sealed. Thus, the tubular film in a state where content is accommodated therein and where the opening thereof is not sealed abuts against and falls along the chute, allowing air in the film to be discharged. As a result, a size of the film pack to be formed can be reduced.

DESCRIPTION OF EMBODIMENTS

An embodiment of the present invention will be described with reference to the drawings.

In FIGS. 1 to 12, reference signs 1 and 2 are two sets of feed rollers disposed (supported by a not illustrated frame) on left and right sides (left and right sides of FIG. 1) of a film sealing mechanism according to the present invention. The feed rollers 1, 2 are composed of rubber rollers 1a, 1b and 2a, 2b, respectively. The rubber rollers 1a and 1b have the same diameter and are disposed in series in a front-rear direction so as to abut against each other. Similarly, the rubber rollers 2a and 2b have the same diameter and are disposed in series in the front-rear direction so as to abut against each other. The rubber rollers 1a, 1b and 2a, 2b function as a feed means for feeding a tubular film CF in which content such as bodily waste is accommodated. More specifically, the rubber rollers 1a, 1b and 2a, 2b feed the tubular film CF downward while holding left and right sides (left and right sides of a toilet bowl) of the tubular film CF. FIGS. 7 to 12 each illustrate the film sealing mechanism according to the present invention as viewed from a bottom surface side thereof and, accordingly, in FIGS. 7 to 12, the tubular film CF is fed to a near side of the paper surface. In the present specification, a front-rear direction of the feed rollers 1, 2 corresponds to an upper-lower direction in FIGS. 7, 9, and 11 and to a left-right direction in FIGS. 3 to 6.

Figure 1:
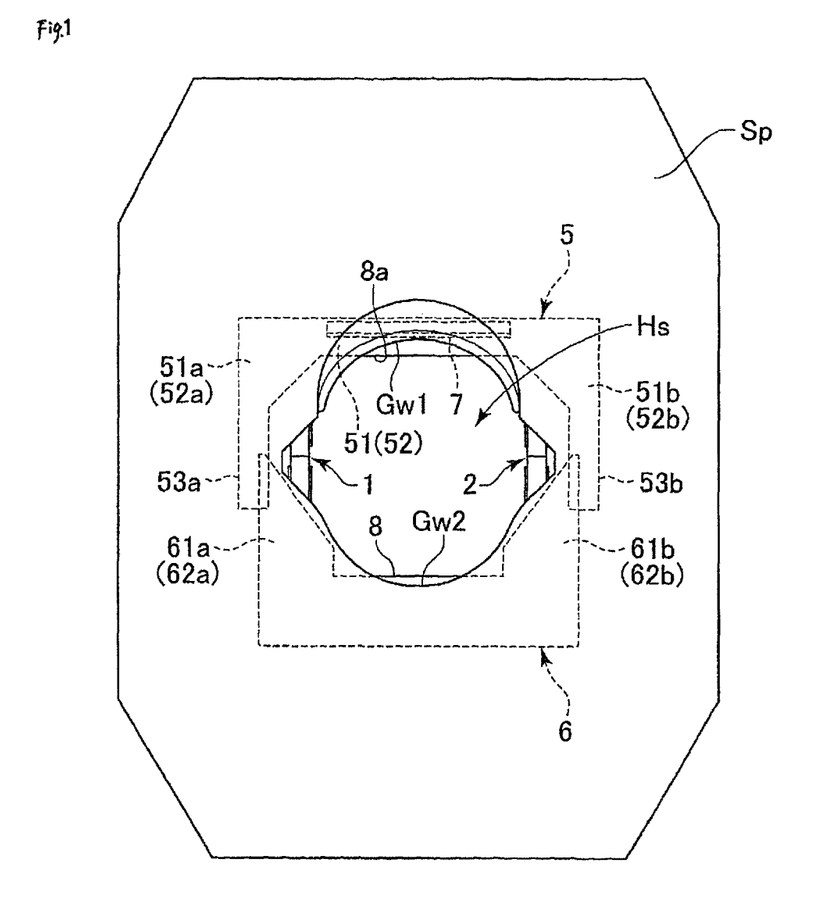
FIG. 1 is a plan view of an example of a film sealing mechanism according to the present invention.
Figure 2:
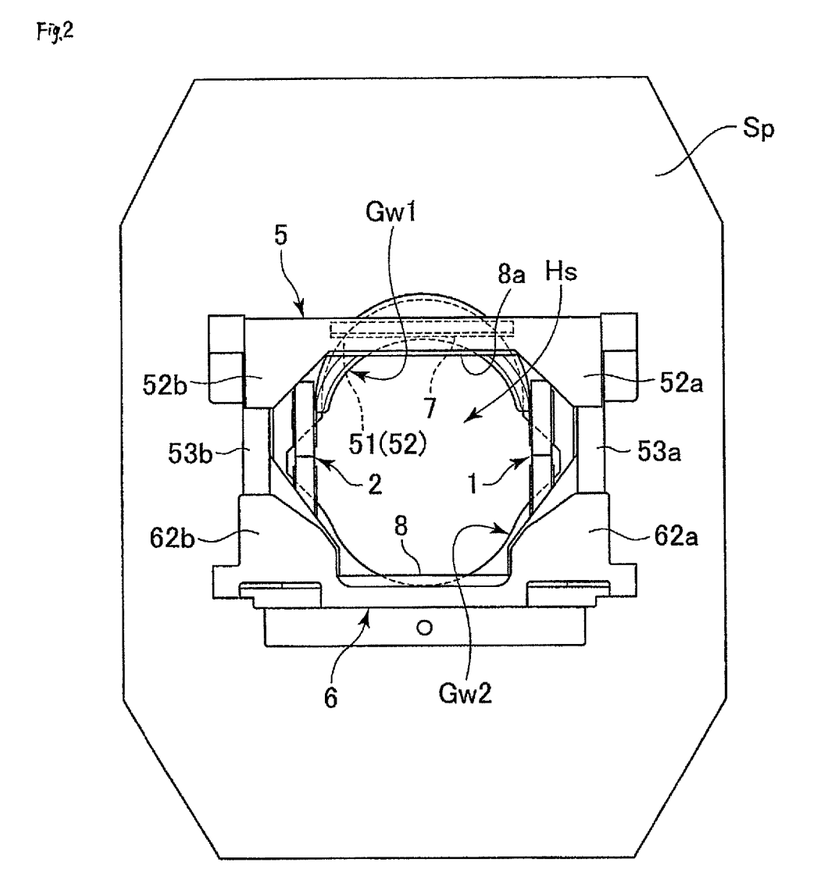
FIG. 2 is a bottom view of the film sealing mechanism illustrated in FIG. 1.
Figure 3:
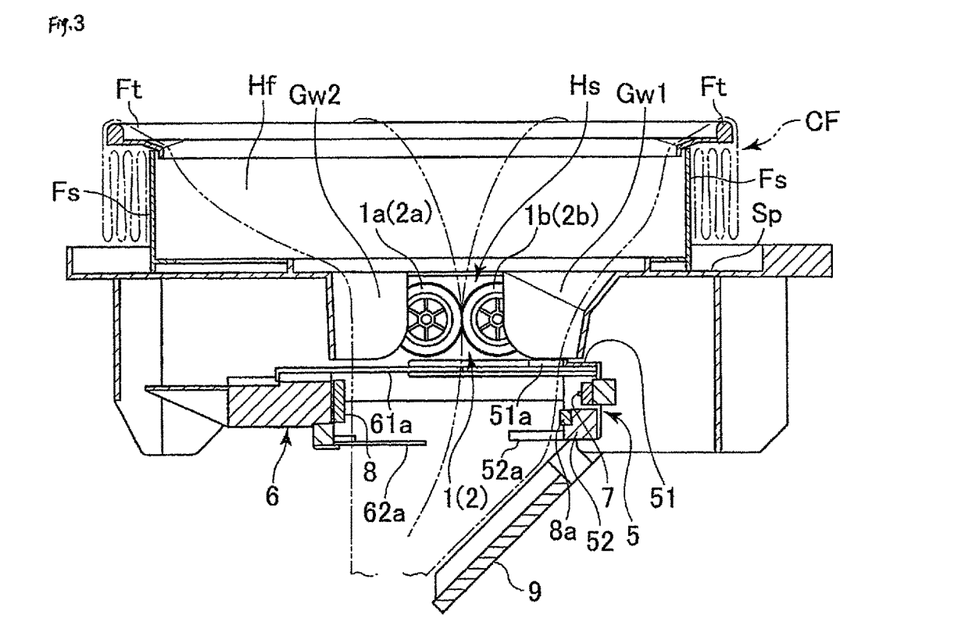
FIG. 3 is a cross-sectional side view of the film sealing mechanism illustrated in FIGS. 1 and 2.
Figure 4:
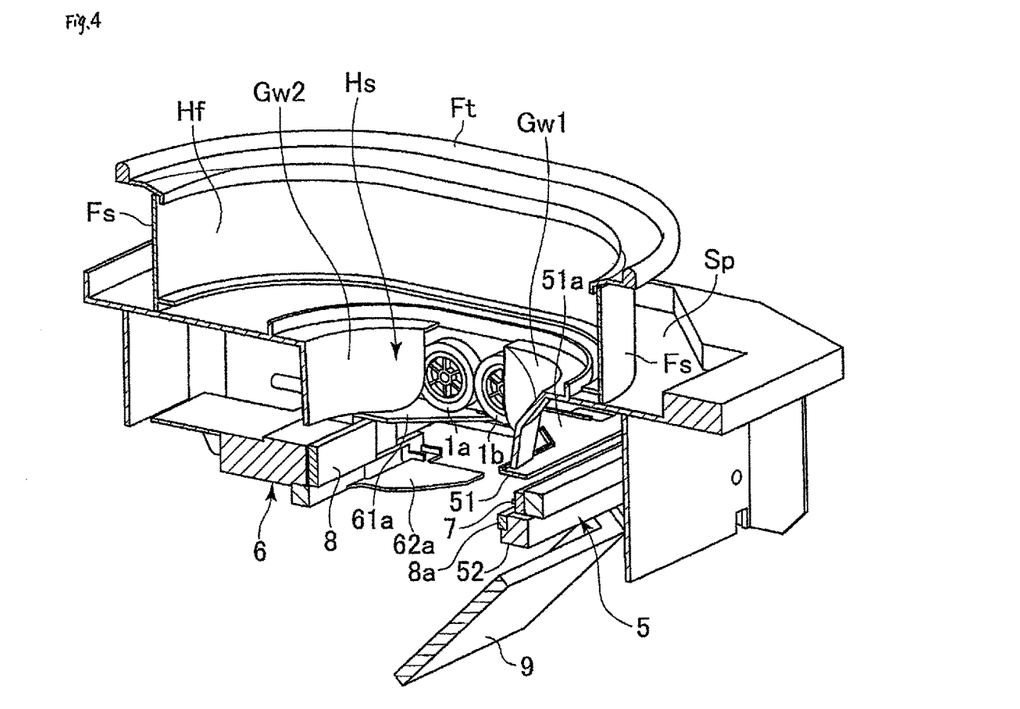
FIG. 4 is a cross-sectional perspective view of the film sealing mechanism illustrated in FIG. 3.
Figure 5:
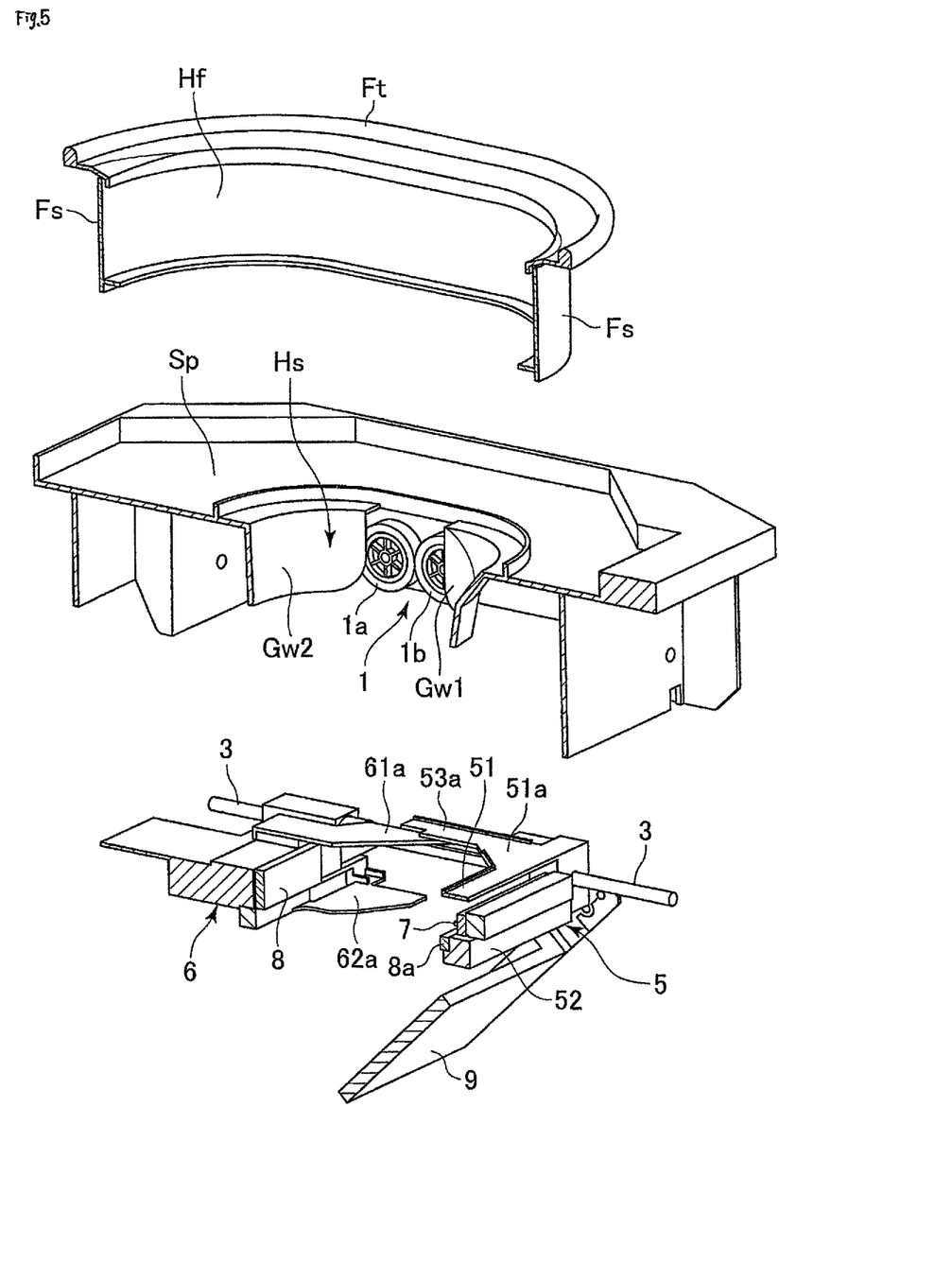
FIG. 5 is an exploded perspective view of the film sealing mechanism illustrated in FIG. 4.
Figure 6:
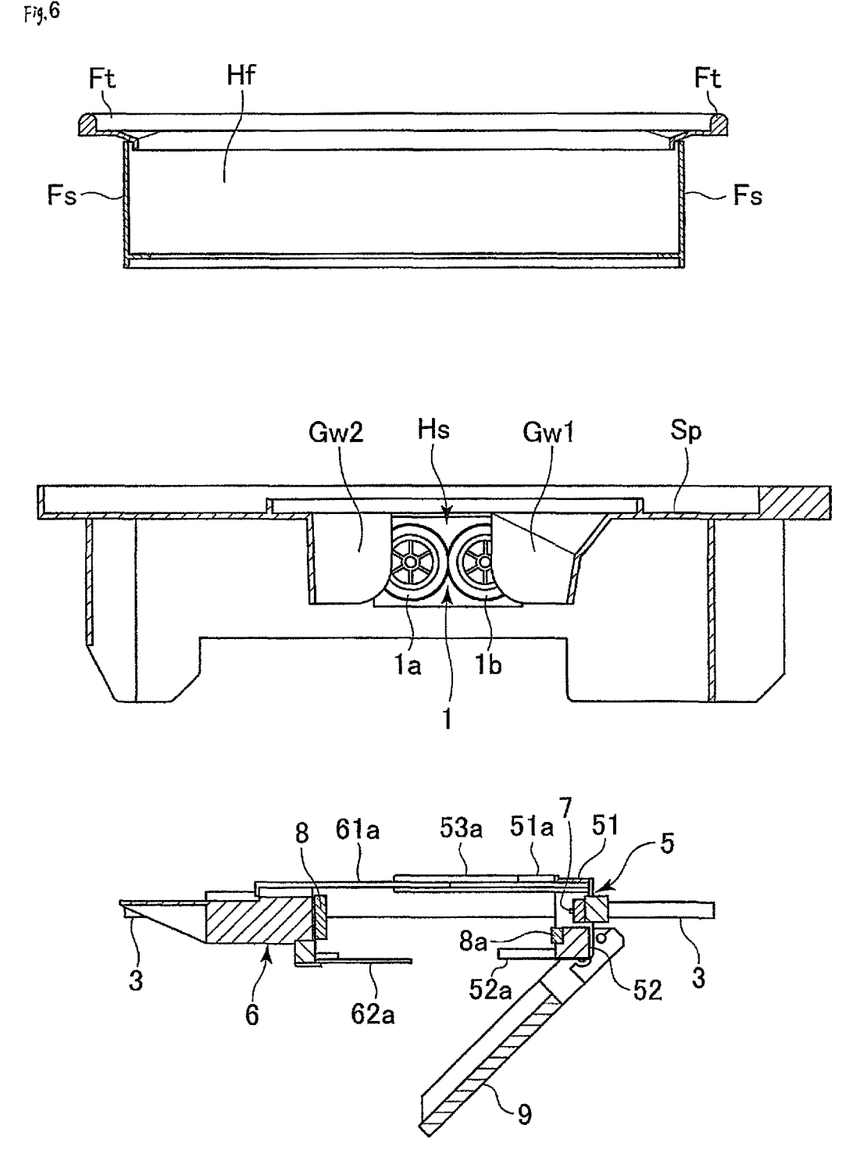
FIG. 6 is an exploded side view of the film sealing mechanism illustrated in FIG. 3.

FIG. 1 is a plan view schematically illustrating a toilet device provided with a film sealing mechanism according to the present invention, FIG. 2 is a bottom view of the film sealing mechanism of the toilet device illustrated in FIG. 1, in which the left and right sides are reversed to those illustrated in FIG. 1, FIG. 3 is a cross-sectional side view schematically illustrating the film sealing mechanism according to the present invention, FIG. 4 is a perspective view of the film sealing mechanism illustrated in FIG. 3, FIG. 5 is an exploded perspective view of the film sealing mechanism illustrated in FIG. 4, and FIG. 6 is an exploded side view of the film sealing mechanism illustrated in FIG. 3.

In FIGS. 1 to 6, reference signs 5, 6, 7, and 8 denote a fixed bracket, a moving bracket, a heater provided on the fixed bracket side, and a heater receiver provided on the moving bracket 6 side, respectively.

Moreover, in FIGS. 1 to 6, Sp denotes a separator for separating the toilet device (not fully illustrated) according to the present invention into an upper half side (toilet bowl side) and a lower half side (mechanism section side) in which mechanism sections such as a film feed mechanism, a heat sealing mechanism, and the like are provided. At a center portion of the separator Sp, a substantially oval or circular hole Hs is formed as a film passage port so as to allow the tubular film CF to pass therethrough.

There is placed above the separator Sp, a substantially oval cylindrical tubular film setting part Fs, outside which the tubular film CF is set. The film setting part Fs has a tubular opening Hf having a shape corresponding to an opening portion of a not illustrated toilet seat and having an outer flange shaped upper end serving as a film turn part Ft. The film CF is set to the toilet device as schematically illustrated in FIG. 3. More specifically, the film CF set to the setting part Fs in a folded state is turned downward at the turn part Ft to the film feed mechanism (inside the tubular filmsetting part Fs) while being stretched and unfolded, and is held at both side portions thereof between the rollers 1, 2.

The left and right feed rollers 1, 2 are disposed substantially immediately below the hole Hs of the film passage port. Moreover, below the feed roller 1 (2), the fixed and moving brackets 5, 6 to be described later and members (heater 7, heater receiver 8, a rod-like film holder 8a provided in a heater side film guide 52 so as to face the heater receiver 8, film guides 51, 52, first and second wing-like parts 51a, 51b; 52a, 52b; and 61a, 61b; etc.) associated with the brackets 5, 6 are disposed. In FIGS. 7 to 12, the upper and lower sides are reversed as compared to those illustrated in FIGS. 3 to 6.

Moreover, there are provided, substantially immediately below the hole Hs of the film passage port, two guide walls Gw1 and Gw2 for guiding the tubular film CF to the feed rollers 1, 2 with their planar shapes formed along the hole Hs. As viewed from above, the two guide walls Gw1 and Gw2 are positioned on front and rear sides with respect to the feed rollers 1, 2 and each have a semi-circular arc-shaped curve. The guide wall Gw2 is suspended vertically, while the guide wall Gw1 extends downward while changing its inclination angle in the middle thereof. The reason for this is as follows.

That is, although a set position of the tubular film CF has a size corresponding to a toilet seat (not illustrated) and is located immediately below the toilet seat, the bodily waste falls to a position closer to the rear with respect to a center of the toilet seat (position closer to a center of the tubular opening Hf of the film setting part Fs) at ordinary use time. Accordingly, the feed rollers 1, 2 and the hole Hs of the separator Sp are offset to the rear. Corresponding to the offset, the inclination angle of the guide wall Gw1 is changed in the middle thereof. As a result, as denoted by a virtual lines of FIG. 3, the film CF extending from the film setting part while being unfolded (stretched) and introduced into the hole Hs is subjected to action of making the width direction thickness of the film at the seal portion uniform, while the film CF is being fed, by the portion of the guide wall Gw1 at which the inclination angle is changed.

In FIGS. 1 to 6 and FIGS. 7 to 12, reference signs 3, 4 are rod-like supports. The rod-like supports 3, 4 are provided below the left and right feed rollers 1, 2 and on the left and right outsides of the film sealing mechanism of the present invention so as to be arranged along the same direction as the arrangement direction of the left-side front and rear rollers 1a and 1b and arrangement direction of the right-side front and rear rollers 2a and 2b. There are mounted, to the rod-like supports 3, 4, the fixed bracket 5 and moving bracket 6. The fixed bracket 5 has film guides 51, 52 vertically sandwiching the heater 7. The moving bracket 6 has, at its vertically intermediate portion, the heater receiver 8 also serving as a film guide.

The fixed bracket 5 is mounted to and across the left and right supports 3, 4 at a predetermined position thereon so as to face the left and right feed rollers 1, 2 and so as to be always subjected to spring force working toward the heater 7 (front side). Thus, when being pushed rearward from the heater 7 side (front side), the fixed bracket 5 goes rearward against the spring force for a required short distance. The fixed bracket 5 has two film guides 51, 52 which are tiered so as to vertically sandwich the heater 7 and each of which has a liner front end as viewed from above. The upper and lower film guides 51, 52 (note that upper and lower sides are reversed in FIGS. 7 to 12) have, at their left and right side end portions, upper first wing-like parts 51a, 51b and lower first wing-like parts 52a, 52b, respectively.

A film holder 8a for holding the fed film in cooperation with the advancing heater receiver 8 is provided at a front surface of the film guide 52. Moreover, the upper first wing-like parts 51a, 52a have guide parts 53a, 53b for guiding second wing-like parts 61a, 61b to be described later inserted thereinto, each of which has a substantially laid U-shape cross section.

As described above, the vertically tiered first wing-like parts 51a, 51b and first wing-like parts 52a, 52b are provided at both ends of the vertically tiered film guides 51, 52 of the fixed bracket 5, respectively, so as to obliquely abut against portions near boundaries between front and rear surfaces and left and right side surfaces of the film CF as viewed from above.

The band-like (or linear) heater 7 is provided, between the upper and lower film guides 51, 52 of the fixed bracket 5, at a portion slightly rearward of the front end edges of the guides 51, 52 in such a manner as to be fixed to the rod-like supports 3, 4 through a mounting bracket (not illustrated) (see FIGS. 3, 5, and 6). A heater wire of the heater 7 may be not only a linear but also a zigzag shape, as viewed from front. As described in the paragraph [0030], the film guide 51 and film guide 52 having the film holder 8a are mounted to the supports 3, 4 through a spring so that the guides 51, 52 are slightly moved rearward of a front surface of the fixed heater 7 when a predetermined pushing force directed rearward (right side in FIGS. 3, 5, and 6) is applied to the front ends thereof by the advancing moving bracket 6 and then automatically recover their original positions when the pushing force is eliminated. While the guides 51, 52 are moved rearward, the fed film is held between the advancing heater receiver 8 and film holder 8a facing and abutting against the heater receiver 8.

On the other hand, the moving bracket 6 is mounted to the supports 3, 4 so as to be capable of forward and backward movement by motive power of a motor (not illustrated) with respect to the fixed bracket 5 along the supports 3, 4. In the moving bracket 6, the heater receiver 8 is provided on a front surface side of the moving bracket 6 at a height position at which the heater receiver 8 and heater 7 face each other so as to protrude from the front surface of the bracket 6. The heater receiver 8 has a length corresponding to a length of the heater 7. The heater receiver 8 also serves as upper and lower film guides corresponding to the upper and lower film guides 51, 52 of the fixed bracket 5. With this configuration, the advancing heater receiver 8 abuts against the film holder 8a of the film guide 52 to holds the fed film before the front surface thereof abuts against the heater 7. It may be arbitrarily determined whether to make the heater receiver 8 serve as the upper and lower film guides of the moving bracket 6 or the upper and lower film guides are provided separately from the heater receiver 8.

Moreover, the second wing-like parts 61a, 61b and second wing-like parts 62a, 62b are provided at both left and right end portions with respect to a moving direction of the moving bracket 6 having, on the front surface thereof, the heater receiver 8, so as to vertically sandwich the heater receiver 8 and so as to correspond to the upper first wing-like parts 51a, 51b and lower first wing-like parts 52a, 52b. The upper second wing-like parts 61a and 61b are inserted into the guide parts 53a, 53b of the fixed bracket 5, each of which has a substantially laid U-shape cross section, and guided to a predetermined position.

Figure 7:
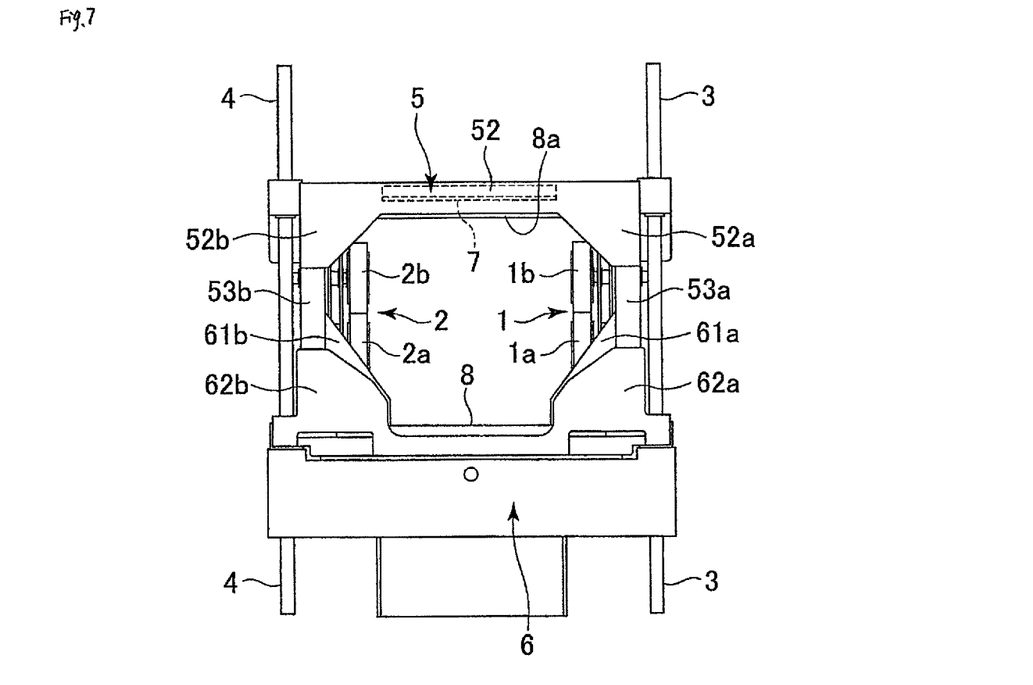
FIG. 7 is a bottom view of the film sealing mechanism illustrated in FIGS. 1 to 6 before operation state (stand-by state).
Figure 8:
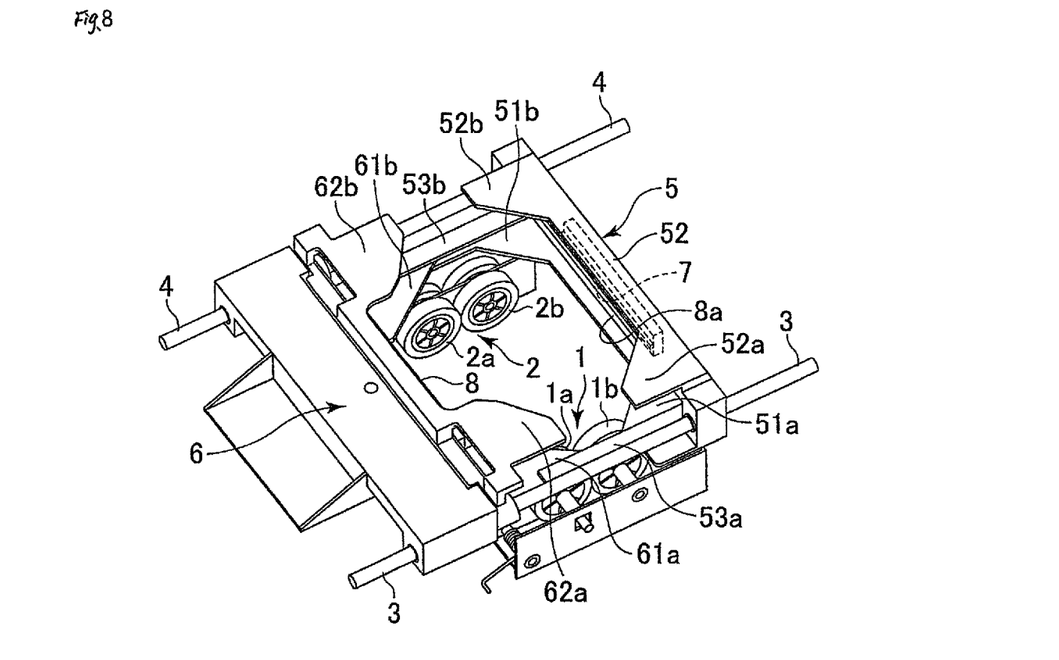
FIG. 8 is a perspective view of the mechanism illustrated in FIG. 7.
Figure 9:
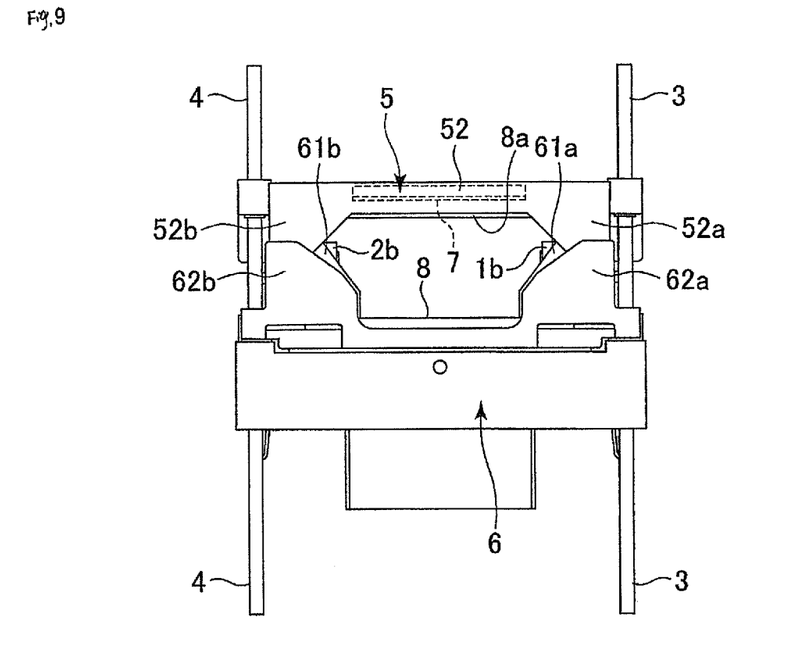
FIG. 9 is a bottom view of the mechanism illustrated in FIGS. 1 to 6 in a middle stage of operation.
Figure 10:
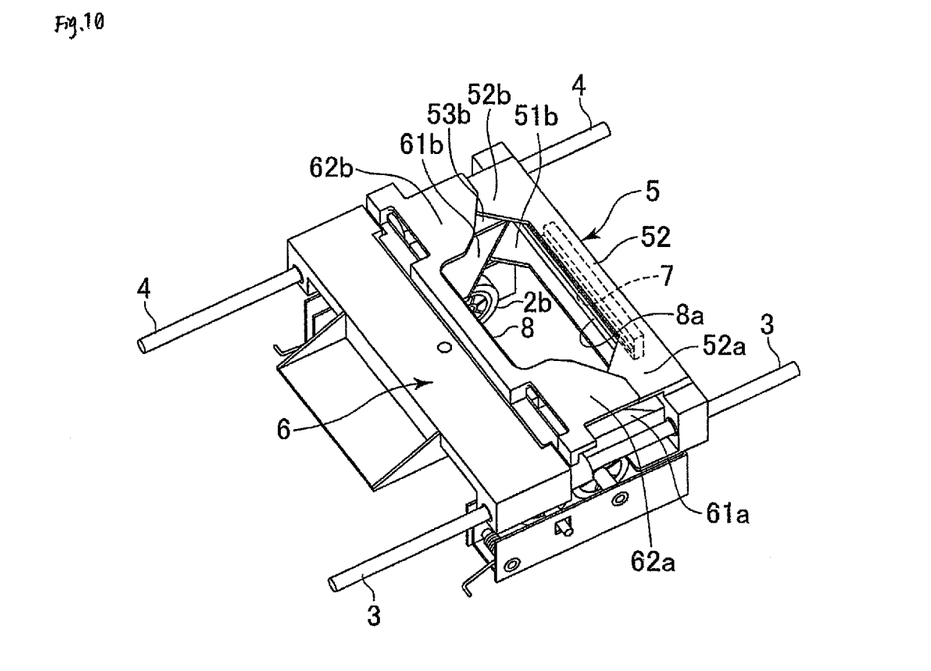
FIG. 10 is a perspective view of the mechanism illustrated in FIG. 9.

When content is accommodated in the tubular film CF set in the toilet device, and the film CF is fed downward (downward in FIGS. 3 to 6; vertically upward with respect to the paper surface in FIGS. 7 to 12) by a predetermined length by the action of the feed rollers 1, 2 to cause the film sealing mechanism of the present invention enters a heat sealing mode for the opening portion of the film CF (see FIG. 3), the moving bracket 6 situated at a start position illustrated in FIGS. 3, 7, and 8 is made to advance toward the fixed bracket 5 by drive force of a not illustrated motor or a cylinder. That is, the moving bracket situated at the position illustrated in FIGS. 7 and 8 is driven by the drive force to be fed to a moving action terminal position illustrated in FIGS. 11 and 12 through an intermediate position illustrated in FIGS. 9 and 10.

Figure 11:
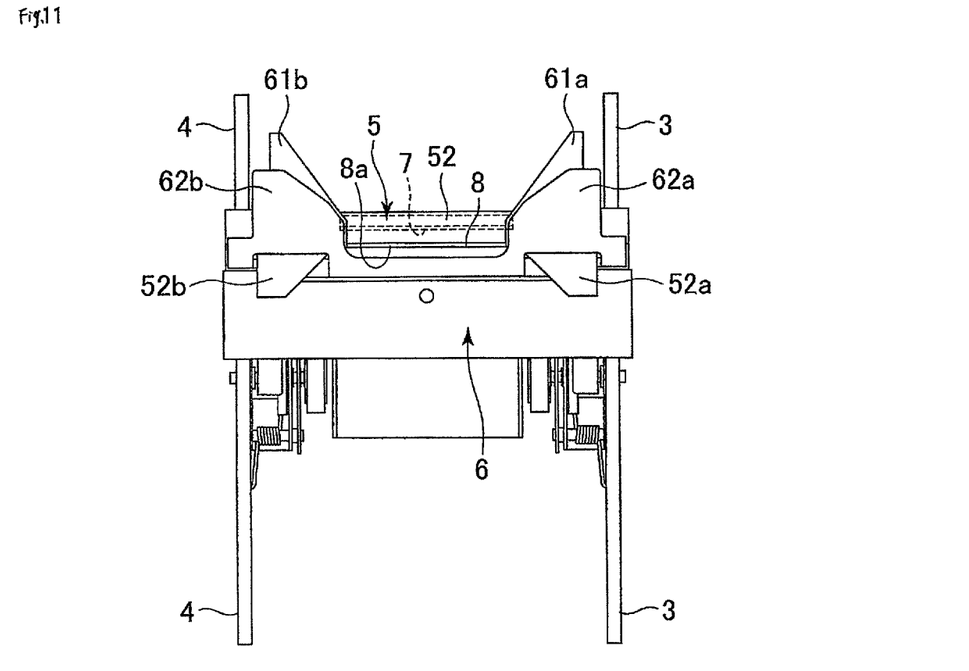
FIG. 11 is a bottom view of the mechanism illustrated in FIGS. 1 to 6 in a terminal stage of operation.
Figure 12:
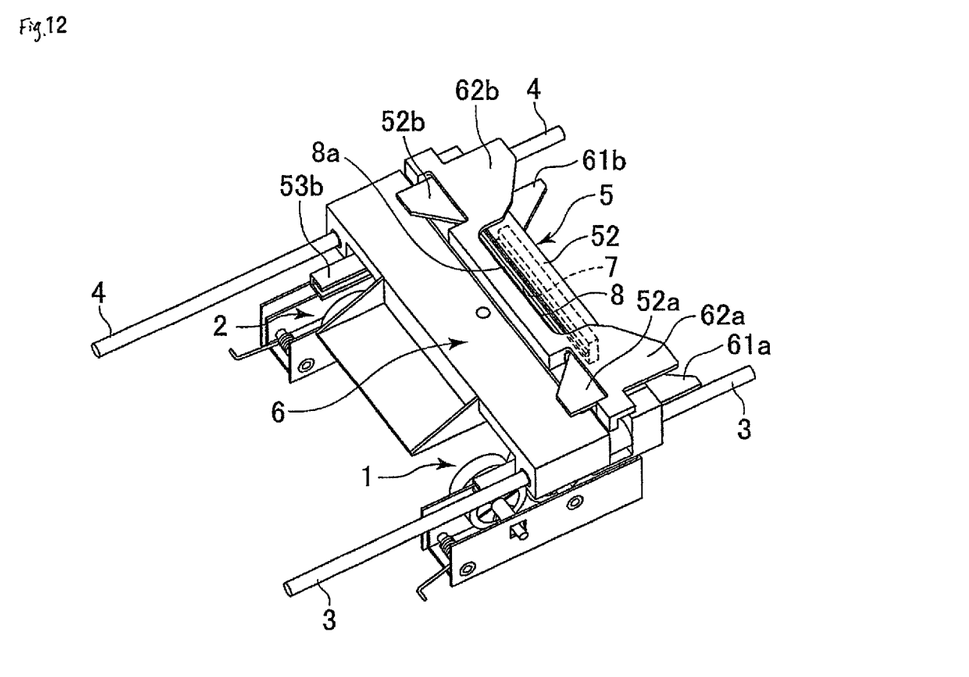
FIG. 12 is a perspective view of the mechanism illustrated in FIG. 11.

While the moving bracket 6 is fed from the position of FIGS. 7 and 8 to position of FIGS. 11 and 12, the front surface linear portions of the film guides 51, 52 of the fixed bracket 5 and the linear side of the heater receiver 8 (film guide) of the moving bracket 6 are brought close to each other and, at the same time, inclined sides of the first wing-like parts 51a, 51b and first wing-like parts 52a, 52b of the fixed bracket 5 which are vertically tiered on the left and right sides and inclined sides of the vertically tiered second wing-like parts 61a, 62b and second wing-like parts 62a, 62b of the moving bracket 6 which are similarly vertically tiered on the left and right sides are brought close to each other. As a result, a diameter of the opening portion of the tubular film CF is shaped into a reduced form in such a manner as if the opening portion is narrowed by human's hand. In the reduced-diameter state, the tubular film CF is first held between the heater receiver 8 and film holder 8a and, immediately after that, held between the heater 7 and heater receiver 8. At this time, the left-right width of the film CF is reduced to a size falling within the left-right width of the heater 7 by the action of the film guides 51, 52 and first and second wing-like parts 51*a* to 61*b*.

While the width-reduced state of the tubular film CF, whose opening portion has been narrowed into a predetermined size (has been reduced in width) between the film guides 51, 52 of the fixed bracket 5 and the heater receiver 8 (filmguide) of the moving bracket 6 and between the first and second wing-like parts 51*a* to 52*b* and 61*a* to 62*b*, is maintained, the moving bracket 6 is further fed to the heater 7 side, and the front end surface of the heater receiver 8 of the moving bracket 6 abuts against a part of the front surfaces of the film guides 51, 52 of the fixed bracket 5. At this time, when the moving bracket is further fed slightly while the film is held between the heater receiver 8 and film holder 8*a*, the fixed bracket 5 (film guides 51, 52) is pushed (backward movement of the fixed bracket) by a minute distance together with the moving bracket 6, causing the heater 7 and heater receiver 8 to be brought into pressure contact with each other. The film CF is held between the heater 7 and heater receiver 8 which are thus brought into pressure contact with each other and, in this state, the entire width-reduced opening portion of the film CF is melted and sealed by heat of the heater 7.

Although not illustrated, the actual device is designed such that even when the front end portion (in this example, the front surface of the heater receiver 8) of the advancing moving bracket 6 abuts against the front surfaces of the film guides 51, 52 (film holder 8*a*) of the fixed bracket 5, the heater 7 and heater receiver 8 do not abut against each other directly, and a gap space is left therebetween. The gap space is a space for arranging a shape of the film opening portion whose thickness has been increased due to the reduced shaping (width reduction). In the present invention, a size of such a space, including whether or not to provide such a space, should be set in accordance with the thickness of a film to be used.

The film CF whose opening has been shaped into a reduced form and heat-sealed while being brought into pressure contact between the heater 7 and heater receiver 8 and subjected to heating therebetween, to be formed into a film pack. Then, the film pack is cut at the sealed portion to naturally fall downward.

In the present invention, for assisting the fall of the film pack that has been heat-sealed and cut, a folding type chute 9 is provided below the fixed bracket 5, as illustrated in FIGS. 3 to 6. The chute 9 is a mechanism for the film pack that has been heat-sealed by the heater 7 and cut at a position corresponding to the bracket 5 to fall toward a center (toward substantially just below the feed rollers 1, 2) of the device.

The chute 9 supports the tubular film CF from below when the opening portion of the film CF in which content is accommodated is subjected to the width reduction to thereby discharge air in the film from the opening portion.

The moving bracket 6 provided with the heater receiver 8 serving also as the film guide that has advanced for performing the width reduction, heat sealing, and cutting of the opening portion of the tubular film CF in which content is accommodated is fed back from the position illustrated in FIGS. 11 and 12 to the position illustrated in FIGS. 7 and 8, entering a standby state for subsequent operation.

As described above, in the film sealing mechanism according to the present invention, in which the heat sealing is applied at a position displaced from a feed line along which the tubular film is fed by the rollers, the width of the film is reduced in a vertically small space in such a manner as not to be separated from the feed means. Moreover, the width reduction can be performed with the length of the film and an aggregated thickness of the film after width reduction in the length direction made substantially uniform. Thus, even for a tubular film having a large opening diameter, it is possible to shape the film into a reduced width form that can be easily heat-sealed by a short length heater.

Moreover, the configuration in which the width-reduction action applied to the film opening portion allows the opening portion that has been shaped into a reduced form to be heat-sealed by a short length heater allows used of a heater using, as a power supply, not only a commercial power supply but also a small capacity power supply such as a car battery, a stacked cell, or a dry cell, whereby an extremely useful film sealing mechanism can be provided.

REFERENCE SIGNS LIST

1, 2 Feed roller
3, 4 Bar-like or rod-like support
5 Fixed bracket
51, 52 Film guide
6 Moving bracket
51*a*, 51*b* Upper first wing-like part
52*a*, 52*b* Lower first wing-like part
61*a*, 61*b* Upper second wing-like part
62*a*, 62*b* Lower second wing-like part
7 Heater
8 Heater receiver serving also as film guide
8*a* Film holder provided in film guide 52
9 Folding type chute

The invention claimed is:

1. A film sealing mechanism provided with an elongated heater and a heater receiver configured to abut against the heater, the heater and heater receiver being disposed opposite, in a direction perpendicular to a position of a feed means comprising a feed roller, to a tubular film in which content is accommodated and which is fed downward from a film passage port by the feed means with its both left and right end portions in a width direction supported, so as to be capable of holding outer surfaces of the film therebetween, the film sealing mechanism comprising:
   a fixed bracket including the heater and two parallel extending film guides vertically sandwiching the heater; and
   a moving bracket disposed opposite to the fixed bracket and including the heater receiver and film guides formed in a front surface of the heater receiver or parallel extending film guides disposed so as to vertically sandwich the heater receiver, wherein
   the film guides of the fixed bracket each include first wing-like parts having a shape in which outer edges obliquely abutting against substantially both left and right side surfaces of the tubular film as viewed from above are opened toward the moving bracket, and
   the film guides of the moving bracket each include second wing-like parts having a shape in which outer edges obliquely abutting against substantially both left and right side surfaces of the tubular film as viewed from above are opened toward the fixed bracket.

2. The film sealing mechanism according to claim 1, wherein a heat sealing width can be made smaller by the film guides and wing-like parts than a width of the film passage port or an interval between the left and right feed means.

3. The film sealing mechanism according to claim 1 or 2, wherein the film guide of the fixed bracket has a guide portion having a substantially laid U-shape cross section and designed to retain a leading end side of one or both of upper and lower second wing-like parts of the moving bracket and receive and guide the moved second wing-like parts.

4. The film sealing mechanism according to any one of claims 1 to 3, wherein the heater receiver of the moving bracket is provided on a front surface side of the moving bracket such that a front surface of the heater receiver is protruded from the front surface of the bracket so as to allow the heater receiver to serve as the upper and lower film guides.

5. The film sealing mechanism according to any one of claims 1 to 4, wherein the film passage port positioned below a toilet seat of a toilet device and above a film feed mechanism is formed into a substantially oval shape or a circular shape, and, among guide walls extending downward from the film passage port, a guide wall on a rear side of the toilet seat is formed as a stepped guide wall in which an inclination angle is changed in the middle thereof.

6. The film sealing mechanism according to any one of claims 1 to 5, wherein a chute inclined downward toward the moving bracket is provided below the heater side fixed bracket so as to be freely foldable.

\* \* \* \* \*